United States Patent
Melikechi et al.

(10) Patent No.: US 7,054,511 B2
(45) Date of Patent: May 30, 2006

(54) OPTICAL COUPLING DEVICE FOR SINGLE MODE OPTICAL FIBERS

(75) Inventors: Noureddine Melikechi, Dover, DE (US); Kamel Amara, Dover, DE (US)

(73) Assignee: Applied Optical Center of Delaware, Inc., Dover, DE (US)

( * ) Notice: Subject to any disclaimer, the term of this patent is extended or adjusted under 35 U.S.C. 154(b) by 167 days.

(21) Appl. No.: 10/678,368

(22) Filed: Oct. 3, 2003

(65) Prior Publication Data

US 2004/0179781 A1 Sep. 16, 2004

Related U.S. Application Data

(60) Provisional application No. 60/454,990, filed on Mar. 14, 2003, provisional application No. 60/472,968, filed on May 23, 2003.

(51) Int. Cl.
- *G02F 1/035* (2006.01)
- *H01S 3/10* (2006.01)
- *G02B 6/24* (2006.01)

(52) U.S. Cl. ............. 385/3; 385/1; 385/39; 372/29.016

(58) Field of Classification Search .............. 385/1–10, 385/39–40, 45, 48–51, 88–94; 372/29.014, 372/29.016

See application file for complete search history.

(56) References Cited

U.S. PATENT DOCUMENTS

| | | | |
|---|---|---|---|
| 4,368,981 A | 1/1983 | Ozeki | |
| 4,784,454 A | 11/1988 | Dyott | |
| 4,956,834 A | 9/1990 | Coleman | |
| 4,991,922 A | 2/1991 | Dahlgren | |
| 5,276,745 A | 1/1994 | Revelli, Jr. | |
| RE34,604 E | 5/1994 | Shaw | |
| 6,490,068 B1 | 12/2002 | Heflinger et al. | |
| 6,493,127 B1 | 12/2002 | Gopalakrishnan | |
| 6,522,449 B1 | 2/2003 | Bisson et al. | |
| 6,552,838 B1 | 4/2003 | Ransijn et al. | |
| 6,587,604 B1 | 7/2003 | Yamauchi | |
| 6,600,843 B1 * | 7/2003 | Sriram et al. | 385/2 |
| 6,616,353 B1 | 9/2003 | Helkey | |
| 6,621,945 B1 | 9/2003 | Bissessur | |
| 6,625,348 B1 | 9/2003 | Deliwala | |
| 2003/0161570 A1 * | 8/2003 | Paniccia | 385/14 |

(Continued)

OTHER PUBLICATIONS

M. Kamel Amara, Noureddine Melikechi; Enhancement of the coupling efficiency in optical fibers using a two-beam optical interference; Applied Physics Letters, May 13, 2002, vol. 80, No. 19, pp. 3494-3496; 2002 American Institute of Physics; USA.

(Continued)

*Primary Examiner*—Michelle Connelly-Cushwa
(74) *Attorney, Agent, or Firm*—RatnerPrestia (57) ABSTRACT

A device for coupling incident radiation to a single mode fiber optic a solid state interferormeter having a front end similar to a Mach-Zehnder integrated interferometer and a back end formed by two converging radiation channels converging at an angle $\theta$ and terminating prior to overlapping. The angle $\theta$ is calculated to produce an interference zone formed by the exiting radiation a primary constructive interference fringe that provides an optimum match to an input fiber mode of a fiber positioned within the interference zone.

27 Claims, 3 Drawing Sheets

U.S. PATENT DOCUMENTS

2004/0179764 A1* 9/2004 Melikechi et al. ............ 385/1

OTHER PUBLICATIONS

Zachary S. Benaich, Ranjit D. Pradhan, Shabbir M. Mian, and Noureddine Melikechi; Effects of Interference in quasiphase-matched periodically segmented potassium titanyl phosphate waveguides; Applied Physics Letters, Nov. 22, 1999, vol. 75, No. 21, pp. 3261-3263; 1999 American Institute of Physics; USA.

Abdulatif Y. Hamad, James P. Wicksted; volume grating produced by intersecting Gaussian beams in an absorbing medium: a Bragg deffraction model; Optics Communications 138, Jun. 1, 1997, pp. 354-364; 1997 Elsevier Science B.V.

G. Humsperger; Photonic Integrated Circuits; Photonic Devices and Systems, 1994, pp. 346-359; Marcel Decker Inc.

* cited by examiner

OPTICAL COUPLING DEVICE FOR SINGLE MODE OPTICAL FIBERS

CROSS REFERENCE TO RELATED APPLICATIONS

This application claims the benefit of priority to U.S. Provisional Application No. 60/454,990, filed on Mar. 14, 2003, and application Ser. No. 60/472,968, filed on May 23, 2003, both the contents of which are incorporated, herein by reference in their entirety.

This application is also related to United States application filed concurrently herewith entitled "Interferometric analog optical modulator for single mode fibers," serial number unknown.

FIELD OF THE INVENTION

This invention relates to apparatus and associated method for coupling the output of an optical radiation source to a single mode optical fiber or optical wave-guide and more particularly to apparatus and associated method employing divergent/convergent optical beam paths to form a constructive interference pattern at an optical input of a single mode fiber or optical wave-guide thereby to couple said fiber or waveguide to said source.

BACKGROUND OF THE INVENTION

In recent years, fiber-optic cables have been increasingly used for communications, particularly in telephone and cable TV systems. Currently it is possible to manufacture long, continuous strands of optical fiber, which may propagate signals without substantial attenuation over long distances. It is also possible to manufacture the fiber structure as an optical wave-guide wherein only preselected modes of light propagate in the fiber. By limiting wave propagation through the fiber to a single mode, the bandwidth of the optical fiber may be exceedingly high to provide a high information-transfer capacity without signal dispersion related problems., Moreover, optical-fiber transmission equipment is compact, lightweight, and potentially inexpensive. Transmission over optical fibers does not generate interference and is unaffected by external interference.

Typically, a long haul and/or high bandwidth signal transmission system employing fiber optics, includes a light source such as a laser diode or an LED, and a photo detector such as a photodiode, connected through a single mode fiber-optic or optical wave-guide cable. Information is typically transmitted in digital form, as a series of light pulses that form a bit stream.

While transmitting information over optical fibers or wave-guides has numerous advantages, information transmission through fibers and their component waveguides suffers from laser-light launching losses into single mode fibers and wave-guide channels whose cross sectional dimensions are in micron range. Typical coupling efficiencies are about 50%. This necessitates using higher power, and therefore cost laser sources and/or using a large number of expensive and cumbersome optical amplification systems including additional pump lasers, Erbium Doped fibers, couplers, gain flattener, optical filters, polarization controllers to compensate for the losses due to the low coupling efficiency.

The simplest coupling system involves bringing the output end of a radiation source in butting engagement with the input end of the receptor. The radiation source may be a laser, an output end of a single mode fiber, a waveguide output etc. Butt coupling suffers considerably from the fiber core-cladding eccentricity and is effective only in permanent junctions. The more customary coupling method involving focusing the output of the radiation source, typically a laser, onto the input of the receptor fiber using a focusing lens is limited in that the focused radiation spot is diffraction limited. In practice the minimum spot size that can be achieved due to the difficulty in obtaining an ideal Gaussian spot is larger than the diffraction limited spot. When such coupling is employed to couple a laser source to a single; mode fiber having typical core diameter of 3–9 microns, the coupling efficiency drops to about 55%.

A method proposed by Peschel et al. using prism coupling is suitable only for large fiber bending angle configurations and re,quires the stripping of the fiber protections and cladding. Fiber stripping is also shown in U.S. Pat. No. 4,784,454 (Dyott) and U.S. Pat. No. 4,991,922 (Dahlgren) which disclose fiber optic coupling methods.

It has also been shown that the use of an interferometer can enhance the coupling efficiency in aquasi-phase-matched second harmonic generation process in a 4 μm wide titanium phosphate waveguide by as much as 61%. (*Effects of interference in quasiphase-matched periodically segmented potassium titanyl phosphate waveguides*, Zachary S. Benaich et al. Applied physics letters, Volume 75, Number 21, Nov. 22, 1999, incorporated herein by reference). The disclosed technique involves passing the fundamental beam through half waveplates and beam splitter cube combination that allows the variation of the power ratio of the two beams and individually coupling each beam into the wave guide using a lens. While this method may be implemented in a laboratory, it suffers in that it is extremely sensitive to vibration and therefore impractical for commercial applications.

There is thus still a need for an efficient coupler for coupling a radiation source to the input of a receptor single mode fiber or optical wave-guide, that is practical, reliable and easy to implement.

SUMMARY OF THE INVENTION

There is, therefore, provided in accordance with the present invention an integral solid state, radiation coupler comprising a radiation input end and a radiation output end said radiation input end connected to said radiation,output end through two diverging and two converging radiation paths wherein said radiation paths converge to said output end at an angle 2θ. θ is an interference angle calculated to produce an exiting radiation interference pattern of radiation entering the input end at an interference zone outside the output end. The interference pattern forms a primary constructive interference fringe whose mode is adapted to maximize energy transfer efficiency from the entering beam to a radiation receiver input end positioned in the interference zone by matching the constructive interference fringe mode to the mode of the radiation receiver input end. As used herein the term matching indicates a best match rather than an absolute match.

In another aspect of this invention, the invention comprises a solid state device comprising a modified solid state Mach-Zehnder interferometer, and a receptor comprising a single mode fiber or an optical wave guide. The integrated solid state device is positioned between an optical radiation source and the single mode fiber. The solid state device includes a radiation propagation axis and comprises a first and a second equal length solid state radiation paths each diverging from the radiation propagation axis at an angle β forming an input beam splitter. The device further comprises a third and a fourth also equal length solid state radiation paths converging toward the radiation propagation axis. The converging paths each converge toward the axis at an angle θ and terminate ahead of, or at, an exit point where the center lines of the converging radiation, paths and the axis intersect. The angle θ, referred to herein as the interference angle, is selected to produce at the exit point of the coupler an interference pattern having a constructive interference fringe that maximizes the energy transfer from the coupler to the input of a receptor.

The device may further comprise a fiber or wave guide holding attachment for holding a fiber or waveguide fixedly at substantially the exit point, such as a clamp.

Alternatively, the fiber optic fiber or waveguide may be glued in place. The fiber or wave guide includes an input surface and such input surface lies in a plane substantially perpendicular to the solid state device radiation propagation axis.

The optical radiation source may be integral with the beam splitter. The optical radiation source may also be a single mode optical fiber or optical wave guide integral with the beam splitter in which case the coupler serves to connect two single mode optical fibers or wave guides.

The solid state interferometer may incorporate in one of the four optical paths an element capable of introducing a radiation propagation phase delay on command from an external source to laterally shift the output position of the interference fringes. Thus the device may operate as an "on/off" switch, able to turn the optical radiation on and off at a point downstream of the coupler, by shifting the constructive interference fringe away from the input face of the single mode fiber or waveguide.

In yet another embodiment of this invention the solid state interferometer with the delay element may be used as a primary coupler to route the optical radiation to one or more selectable paths by shifting the position of the constructive interference fringe laterally to the input of any one of a plurality of radiation receptors arrayed side by side. The radiation receptors may be single mode fibers, waveguides, or additional solid state interferometric couplers which may be integrally constructed at the output of the primary coupler providing further multiple paths for incoming radiation.

Still according to this invention there is provided a solid state system comprising:
A. a radiation source;
B. a solid state radiation coupler comprising a radiation input end adapted to receive an output of said radiation source and a radiation output end, the coupler having a central axis extending along a "z" axis of a Cartesian coordinate system, the coupler further comprising:
  i. an input radiation beam splitter comprising first and a second equidistant diverging solid state radiation propagation channels extending from said coupler input each of said channels having a first and a second length respectively;
  ii. a third and a fourth also solid state equidistant converging radiation propagation channels connected to said first and second diverging channels respectively, each of said third and fourth channels having a third and a fourth length respectively, each of said third and fourth channels converging toward said z axis at an interference angle "θ" relative to said axis and wherein said third and fourth channels terminate without overlap at the beginning of or prior to a radiation interference zone where radiation exiting said third and fourth channels generates an interference pattern, said zone extending by a distance $L_{int}/2$ from a point on said z axis where a center line of a beam propagating along said third channel and a beam propagating along said fourth channel intersect; and
C. a radiation receptor having an input surface located within said interference zone.

Associated with this apparatus there is also a method of maximizing energy transfer between an optical radiation source and a desired radiation receptor. The receptor may be a single mode optical fiber or an optical wave guide. Such method comprises splitting the optical radiation into two substantially equal intensity beams raveling along two distinct solid state paths and recombining the two beams onto the input surface of the receptor single mode fiber by directing the beams onto the input surface at an angle relative to each other calculated to generate a constructive spatial interference mode within an interference zone that maximizes energy transfer to the receptor by optimal matching of the constructive interference spatial mode to the receptor effective input mode.

DETAILED DESCRIPTION OF THE INVENTION

The invention will next be described with reference to the figures wherein same numerals are used to identify same elements in, all figures. The figures illustrate the invention and are not intended to act as engineering or construction drawings, therefore they are not to scale and do not include all elements that may be included in such drawings, as inclusion of such elements would unduly clutter the drawings. The invention will also be described with specific reference to the use of a single mode fiber (SMF) but the invention is similarly applicable for coupling an optical wave-guide to a radiation source or to another wave-guide.

Figure 1:
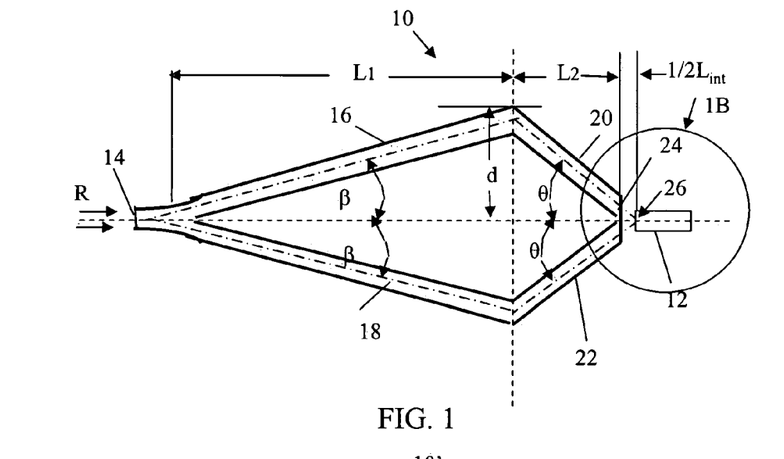
FIG. 1 is a schematic representation of an optical coupler in accordance with the present invention.
Figure 2:
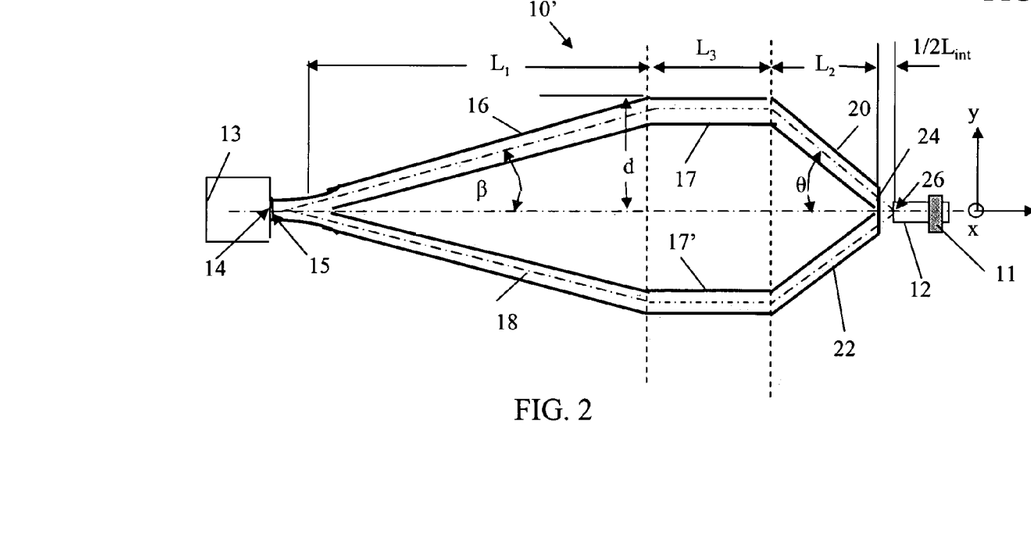
FIG. 2 is a schematic representation of an alternate embodiment of the invention comprising an integral radiation source formed at the input end of the coupler.

Referring next to FIG. 1 there is shown a solid state interferometer based coupler 10 for connecting a single mode fiber 12 to input radiation R. The coupler comprises a front end section that includes an input end 14 followed by a Y-junction divider having a first channel 16 and a second channel 18. Preferably the Y-junction divider is a 3 dB splitter that splits the input radiation into two equal energy beams that propagate along channels 16 and 18. FIG. 2. illustrates an alternate embodiment where following the splitting of the input radiation along two diverging channels 16 and 18, the radiation propagates along two substantially parallel channels 17 and 17' as in a typical integrated Mach-Zehnder interferometer.

An integrated Mach-Zehnder interferometer is a well known device that consists of an input "Y" junction which causes the light propagating in a single channel wave guide to be split into two channel waveguides. At some distance from this input junction a simple bend is incorporated in both channels to cause the channels to become parallel to one another. Light then propagates in parallel straight sections of channel waveguides until it reaches a beam combining section. The beam combining section is the reverse of the beam splitting section; that is, parallel channels encounter simple bends which direct the two channels into the two waveguide end of a second "Y" junction. Light emerges from this output Y-junction in a single-channel waveguide. Typically, the paths along two channels are not identical in length thereby introducing a phase difference between the two recombining beams and producing an interference pattern following recombination at the output "Y" junction. It is common practice in using an integrated Mach-Zehnder interferometer to enhance this effect by introducing a phase delay element in one, or both, of the two parallel channels and control the degree of phase shift between the two interfering beams.

The solid state interferometer based coupler according to this invention differs from the typical integrated Mach-Zehnder interferometer described above in the structure of the output section. As illustrated in FIG. 1, the back end of the coupler also includes two converging channels 20 and 22. Channels 20 and 22 are connected to channels 16 and 18 respectively, either directly or, as shown in FIG. 2, through parallel channels 17 and 17', and the four channels together provide two continuous radiation propagation paths between the coupler input 14 and output 24. However, according to the present invention, the two converging channels 20 and 22 do not form a "Y" junction terminating to a single output channel.

For ease of description we will refer to a preferred embodiment arrangement wherein the radiation propagation channels are all in a single plane. A particular Cartesian coordinate axis system "xyz" shown in FIG. 2, is used for ease of understanding the relationship between the parts of this device. The radiation propagates in the direction of the "z" axis and the coupler contains a propagation axis along the "z" axis. Diverging and converging angles are angles in the y-z plane, relative to the propagation axis "z" and substantially parallel channels unless noted otherwise refer to channels extending parallel to the "z" axis. Finally the center lines of the different channels are also shown but not separately numbered.

Even though the invention is explained and illustrated with reference to the preferred structure wherein all channels and the central axis are in a single plane, the invention is not so limited and the channels may lie in different channels so long as opposing channels are in a single plane. For example, opposing diverging channels 16 and 18 may be in a first plane and opposing channels 20 and 22 may be in a different plane. In such case the interference zone described bellow will be in the same plane as the converging opposing channels and the interference angle θ, also described below, will be measured in this plane.

Preferably the device is formed as a solid state structure on a substrate. The channels are formed by local modification of the index of refraction of the substrate. This may be done through optical (or electronic) beam lithography or crystal growth in association with ion exchange processes of electro-optical crystals. Alternatively, quantum well growth (Molecular Beam Epitaxy, MBE, or metal-organic chemical vapor deposition, MOVCD) of a core and a cladding in semiconductor materials such as for example GaAs, or AlGaAs, may be used, particularly where it is desired to produce the coupler with an integral laser radiation source at its input as shown in FIG. 2. Recently developed technology for optical writing using intense femtosecond laser beams on silica or BK7 glass for the manufacture of passive components may also be used to produce the optical or waveguide channels.

At the input end of the coupler, radiation R may be coupled in any of the known ways including another coupler designed according to the present invention. Alternatively, as shown in FIG. 2, in the particular case where the input radiation source is a solid state laser 13, the coupler 10' is, preferably, grown integral with the laser 13 at the output of the lasing surface 15.

Input radiation at the interferometer coupler input 14 is split into two equal diverging paths 16 and 18 and then recombined at an output point 26 after traveling along converging paths 20 and 22 generating an interference pattern at the output of the coupler 10. FIG. 1B illustrates the area of beam interference at the coupler output and accordingly the optimum positioning of the input end of the single mode fiber or wave guide 12.

Figure 1A:
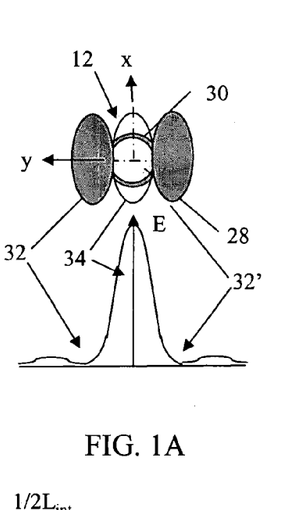
FIG. 1A is a schematic representation of the spatial modes of the interference: pattern generated at the output of the coupler superposed on the input surface of a single mode fiber positioned in the x-y plane in the interference zone.
Figures 1B, 3, 3A:
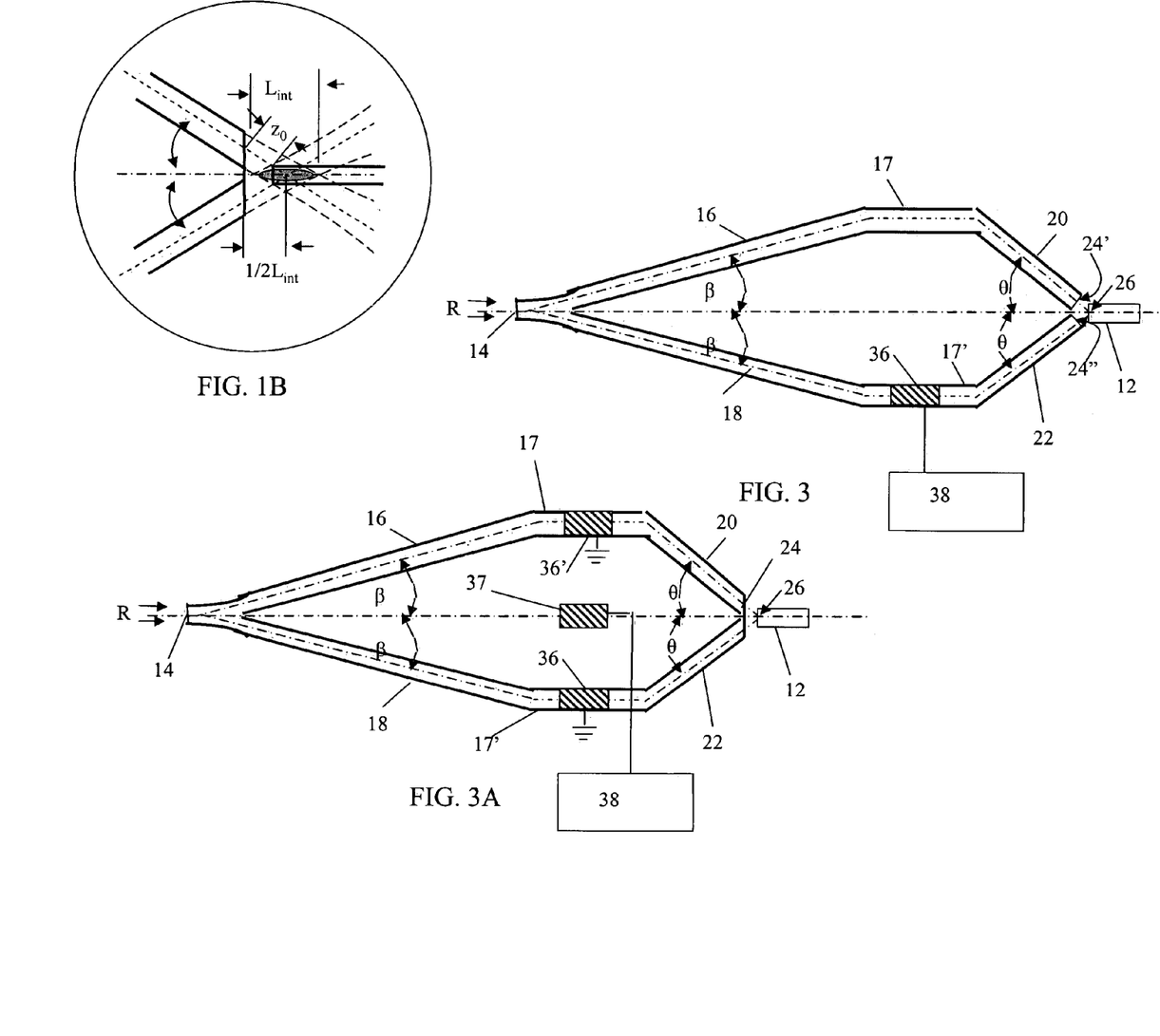
FIG. 1B is an enlarged schematic representation, of the area within the circle in FIG. 1 illustrating the output end of the coupler and relative positioning of the single mode fiber input end ire greater detail.
FIG. 3 is a schematic representation illustrating a switching coupler according to this invention including a phase delay in one radiation channel.
FIG. 3A is an alternate embodiment of the device illustrated in FIG. 3 incorporating phase delay devices in both parallel channels.

The optimization of energy transfer from the radiation source to the receiving element is obtained by calculating a converging angle "θ" for each of the converging channels 20 and 22 such that the primary constructive spatial interference fringe mode 34 generated at the output of the coupler has a width and shape that best matches the effective mode of the single mode fiber or wave guide as shown in FIG. 1A. By matching the spatial interference mode to the fiber mode, maximum energy transfer between the input radiation and the receiving single mode fiber is achieved.

With both converging angles θ equal, the radiation exiting both channels 20 and 22 converges on the coupler axis z forming an interference zone defined by the beam width (waist) of the two channels as shown in FIG. 1B. FIG. 1A shows the interference pattern in the x-y plane incident on the face of a single mode fiber 12 comprising a core 28 and a cladding 30 placed at the point where the center lines of the radiation beams intersect. The interference pattern comprises bright 34 and dark 32 and 32' generally oval shaped spatial interference fringes formed by the constructive and destructive interference of radiation exiting at different angles (+ and −θ) from the coupler.

Proper selection of the optical length, of the converging radiation paths and angle θ, permits controlling the shape and location of the interference pattern to maximize energy transfer at the output of the coupler to the single mode fiber 12 by matching the interference fringe mode to the fiber mode field at a particular location along the z axis. Optical length is the product of the physical length (measured in m or inch) by the refractive index of the waveguide or channel core. When the receiving fiber is a single mode fiber what is matched is the mode field diameter (MFD) for that fiber. The use of such interference mode match permits coupling efficiencies of the order of 91%.

Selection of the interference angle θ is a function of the wavelength and spatial characteristics of the input radiation beam R and the output fiber 12. This angle is estimated from overlapping-integral calculations of the fiber optic and the incident spatial interference mode profiles and is derived by maximizing the theoretical energy transfer efficiency "η" for the constructive fringe mode that matches the fiber mode. The numerical calculations, based on the overlapping integrals shown bellow, convolute the mode profile of the fiber with the optical intensity distribution of the interference fringe mode for different values of θ. θ is calculated by calculating η for the interfering beams beginning with an assumed starting angle θ and varying θ to maximize the coupling efficiency η.

The diameter, $2\omega_D$, of the SMF Gaussian mode field profile (MFD) is determined empirically using Marcusse's equation relating the radius of the mode field, to the core radius of the fiber "a", and the normalized fiber number, "V":

$$\omega_D = a \cdot (0.65 + 1.619/(V^{3/2}) + 2.879/(V^6))$$

where V is given by: $V = 2\pi \cdot a \cdot NA/\lambda$ and where NA is the numerical aperture of the fiber.

The coupling efficiency, η, can then be obtained by calculating the normalized integral:

$$\eta = \frac{\int_0^{a\omega_0} e^{-r^2/\omega_D^2} \cdot f(r) \cdot r \, dr}{\left(\int_0^{a\omega_0} e^{-2r^2/\omega_D^2} \cdot r \, dr \cdot \int_0^{a\omega_0} f^2(r) \cdot r \, dr\right)^{0.5}}$$

where f(r) is the incident light intensity profile function and $\exp(-r^2/\omega_D^2)$ is the fiber mode distribution. The estimated coupling efficiency for the interference fringe is arrived at by using the corresponding profile functions f(r) coupled into the SMF.

Each beam propagating in each channel of the interferometer is assumed to have a Gaussian profile. The Gaussian beam profile function is determined by, $(1/\omega_o) \cdot \exp(-r^2/\omega_o^2)$, where $\omega_o$ is the focused beam waist. $E_1$ and $E_2$ represent the beam optical field amplitude of the radiation emanating from each channel of the interferometer respectively, $|E_1(r) + E^2(r)|^2$ represents the interference intensity profile function, where $E_i(r)$ stands for the field amplitude of the two interfering Gaussian beams (i=1,2). Because the two beams propagate at an angle +θ and −θ respectively, $E_i$ is a function along the z axis and is a function of θ therefore ultimately η is a function of θ. (See also Optics Communications, 138 (1997) 354–364 *Volume Grating Produced by Intersecting Gaussian Beams in an absorbing medium: A Bragg diffraction model* by Abdulatif Y. Hamad and James P. Wickstead. For a more complete derivation of the formulae used to calculate η as a function of θ).

As shown in FIG. 1B, at the exit of the coupler according to this invention there is a zone of interference between the two beams exiting channels 20 and 22 respectively. This zone can be easily calculated from simple geometry once the beam waist (which is the substantially equal to the radius, $\omega_D$, of the Gaussian mode field profile of the propagation channel at this point.) and the interference angle θ are known. This calculation provides an interference zone of total length $L_{int}$ extending equally along axis "z" on either side of the point of intersection of the exiting beams centerline which, because θ is the same for both beams, is on axis "z".

EXAMPLE

Using the calculations shown in the appendix the following results are obtained for a coupler such as illustrated in FIG. 1, the length of the channels 16, 18, 20 and 22 and the diverging and converging angles β and θ for a particular type of single mode fiber, specifically a Corning SMF 28. This fiber has a typical MFD=8.2 μm and a NA=0.14. For this fiber and at λ=1550 nm, V=2.33. For an input (to the fiber) beam waist $\omega_0$=8.1 μm, $V \times \omega_0$=18.87 μm, yielding an optimum interference angle (converging angle θ) of about 2.9°.

The interference is localized where the two output beams cross as illustrated in FIG. 1B. Having determined the converging angle, simple geometrical considerations from FIG. 1B indicate that the input end of the single mode fiber 12 (in this example the input face of SMF28) may be placed anywhere between $+1/2L_{int}$ and $-1/2L_{int}$ from the crossing point, in this instance a total $L_{int}$=162 μm.

Having defined the interference zone, it is noted that maximum energy transfer occurs when the input of the single mode fiber or wave guide is positioned at the Rayleigh distance from the end of the channel, as this is the highest energy concentration point (minimum waist) of the emerging radiation beam. The Rayleigh range $z_o$ is as shown in FIG. 1B along the propagation axis of the channel and its value equals $\pi \cdot (\omega_o)^2 / \lambda$.

For a laser emitting at λ=1550 nm the corresponding Rayleigh range is 34.1 μm. For an optimum coupling efficiency, it is preferable, in this case, to set the input face of the output fiber within the projected Rayleigh range, $z_o \cdot \cos \theta = 34.02 \approx 34$ μm since it is smaller than the interference zone length $L_{int}$.

$L_2$ is calculated as $L_2 = d/\tan 2.9°$ or ≅2 mm, providing a typical lateral offset d=100 μm.

Typically, the front end parameters (L1 and β) may also be estimated using the same overlapping integrals as before. However such calculation is eliminated by the use of commonly available Mach-Zehnder interferometer technology. For a typical offset d=100 μm L1 is 20 mm and β=0.29°.(See also the following: G. Hunsperger, *Photonlic Devices and Systems*, Ed. Marcel Dekker, Inc. (1994), pp. 346–359.) Hence in this example, the total coupler length equals 22 mm.

In practice, due to manufacturing limitations regarding the exact termination point of the two channels 20 and 22, it is preferred to position the input face of the receiving fiber or wave guide at a point on the z axis as close to the calculated distance from the end of the coupler and experimentally move the fiber or wave guide back and forth along the z axis to maximize energy transfer by matching the actual interference fringe mode to the fiber or wave guide fiber mode. Once the optimum position has been determined the fiber input face and the fiber are fixed relative to the output end of the coupler. Fixing may be by gluing, soldering (for metal coated fibers) or by a clamp 11 as shown in FIG. 2.

Figures 4, 4A:
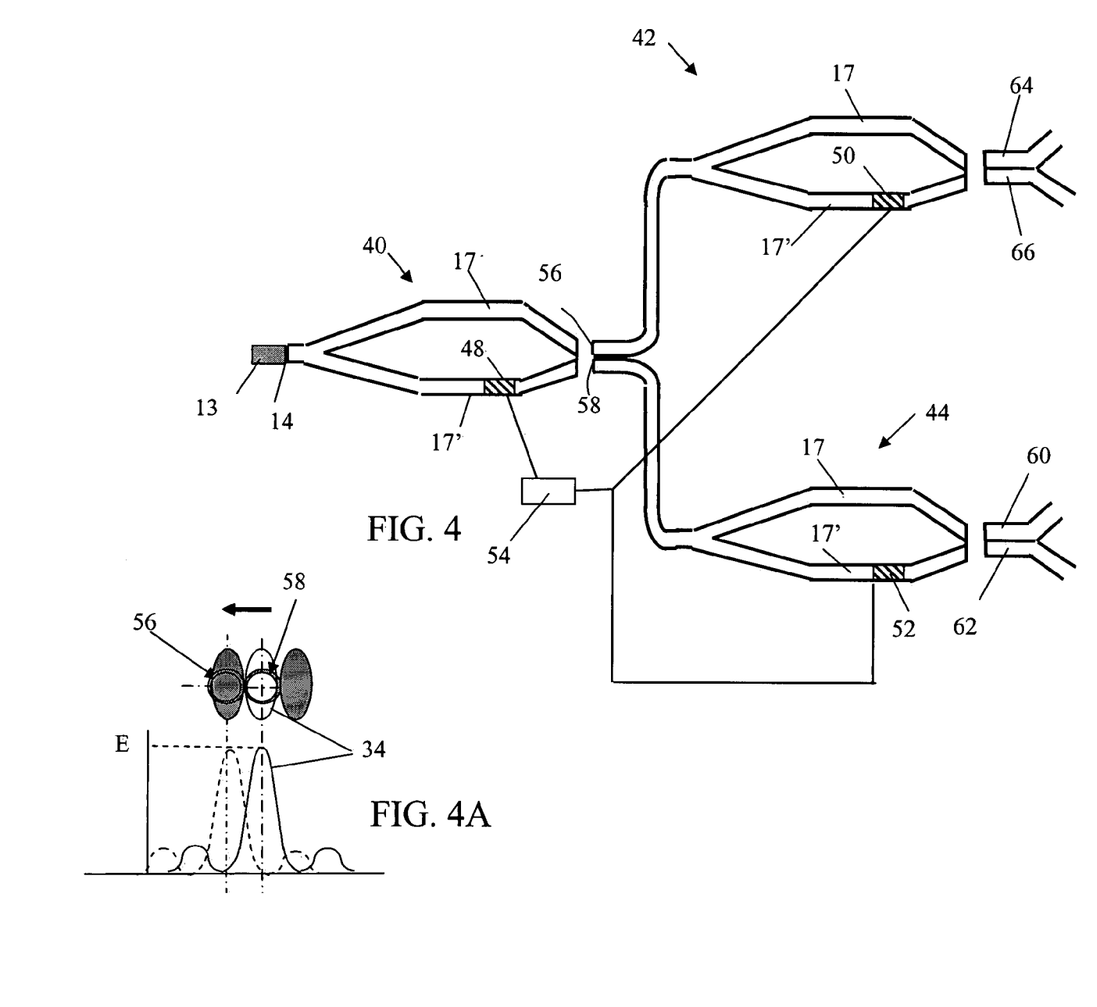
FIG. 4 is a schematic representation illustrating the use of the coupler according to this invention used as a routing switch directing the input radiation to one of a plurality of single mode fiber or optical wave-guide paths.
FIG. 4A is a view illustrating two optical fiber input surfaces in the x-y plane in the interference zone and superposed thereon an interference pattern illustrating the use of the present invention for switching radiation paths from one fiber to a second fiber.

FIG. 3 shows an alternate embodiment in which there is inserted in channel 17' a delay device 36 which may be used with an external control 38 to introduce a phase delay in radiation traveling along this path. The introduction of such delay introduces a phase shift between the radiation traveling along this path and radiation traveling along the other path and results in a lateral shifting of the interference bands in the x-y plane. Thus the interferometer functions as a switch by laterally shifting the constructive interference fringe 34 to the right or left, as shown in FIG. 4A.

Also shown in FIG. 3 is an alternate termination for the converging channels 20 and 22, which terminate in exit faces 24' and 24". Exit faces 24' and 24" are perpendicular to the channel axes rather than in a common x-y plane, a structure that is preferred as it is easier to manufacture.

The delay device may comprise a conductive-layer deposited on a portion of the outside of the channel to form an electrode 36 and the delay control 38 may be a source of DC voltage for applying a DC bias to the electrode, as is well known in the art. A locally applied electric field changes the local refractive index of the channel material. The variation in the refractive index results in a change in the phase of the light signal that travels along the channel.

In the preferred alternative embodiment shown in FIG. 3A, phase shifting electrodes 36 and 36' are applied to both channels and are connected to the controller 38 in a push pull configuration where two opposite electrical fields are applied to two parallel channels of the coupler 17 and 17'. The grounding of the two external pads and the application of the voltage to a central electrode 37 create opposite effects in the two waveguide-channels. The two refractive index changes are of opposite signs and correspond ultimately to two phase delays of opposite signs as well. The presence of phase shifting electrodes can be used to shift the interference fringes in and out of the input face of the receiving fiber or waveguide and consequently switch ON/OFF the radiation at the input of optical fiber 12 permitting the solid state interferometer coupler to act as a solid state switching digital device for communication purposes.

FIG. 4 shows a structure that combines a plurality of switching interferometer couplers according to this invention formed and interconnected to provide a routing system for incoming radiation. As shown in this figure, each of the interferometers 40, 42 and 44 includes a delay device 48, 50 and 52, respectively controlled by a controller 54. The output of interferometer 40 is coupled to the input 56 and 58 of the two interferometers 42 and 44 respectively. Inputs 56 and 58 are formed adjacent each other as shown in FIG. 4A. As shown in this figure, the constructive mode for one bias voltage value applied to the delay device 48 in leg 17' of interferometer coupler 40 falls on the input 58 of interferometer coupler 44, and radiation from laser 13 is coupled to interferometer 44. By changing the DC bias to shift the interference fringes laterally, as shown by the dotted lines in FIG. 4A, the constructive radiation fringe falls on the input 56 of interferometer 42. Similarly, interferometers 42 and 44 may further be coupled to single mode fibers (SMF) 60, 62, 64, and 66, which may also be solid state interferometer inputs or simple SMF inputs. A control system 54 connected to phase delay electrodes 48, 50 and 52 may be used to apply the appropriate bias voltage to effectuate the wanted band shift to direct the radiation to any one of the output fibers 60, 62, 64 or 66.

While preferred embodiments of the invention have been shown and described herein, it will be understood that such embodiments are provided by way of example only. Numerous variations, changes and substitutions will occur to those skilled in the art without departing from the spirit of the invention. For example, while the device has been described as a switching device it may also be used in the same configuration as a digital modulator rather than a simple switch by simply replacing the controller 38 in FIG. 3 or 3A with a digital modulator. Accordingly, it is intended that the appended claims cover all such variations as fall within the spirit and scope of the invention.

What is claimed:

1. An integral solid state radiation coupler comprising:
   (a) a radiation input end,
   (b) a radiation output end,
   said radiation input end being connected to said radiation output end through two radiation paths that diverge from said input followed by two radiation paths that converge toward said output end at an angle 2θ and
   (c) an interference zone outside said output end, wherein θ is an interference angle calculated to produce an exiting radiation interference pattern in said zone for radiation entering said input end and
   wherein said interference pattern has a primary constructive interference fringe adapted to maximize energy transfer efficiency between said entering beam and a radiation receiver input end positioned in said interference zone by matching said primary constructive interference fringe mode to said radiation receiver input end mode.

2. The coupler according to claim 1 wherein said radiation is optical radiation.

3. The coupler according to claim 2 wherein said converging and diverging radiation paths are solid state optical channels.

4. The coupler according to claim 2 wherein said radiation is emitted by a laser and said laser is integral with said coupler input end.

5. The coupler according to claim 1 wherein said converging and diverging radiation paths are solid state waveguides.

6. An integral solid state radiation coupler comprising a radiation input end and a radiation output end, the coupler having a central axis extending along a "z" axis of a Cartesian co-ordinate system, the coupler further comprising:
   a. an input radiation beam splitter comprising a first and a second diverging equidistant solid state radiation propagation channels extending from said coupler input, each of said channels diverging relative to said central axis;
   b. a third and a fourth also solid state equidistant converging radiation propagation channels connected to said first and second diverging channels respectively, each of said third and fourth channels converging toward said z axis at a substantially same interference angle "θ" relative to said axis,
   c. wherein:
      i. radiation exiting said third and fourth channels generates an interference pattern in an interference zone, said zone extending by a distance $L_{int}/2$ on either side of a point on said z axis where a center line of a beam propagating along said third channel and a beam propagating along said fourth channel intersect; and
      ii. said third and said fourth channels terminate prior to overlapping at or before the onset of said interference zone; and
   d. said interference angle θ is calculated to optimize matching a primary constructive interference fringe mode in said interference zone to an input end mode of an energy receptor placed in said interference zone.

7. The coupler according to claim 6 further comprising at least one phase delay element in at least one of said first, second, third or fourth channels.

8. The coupler according to claim 6 further comprising a first phase delay element in one of said first, or third channels and second phase delay element in one of said second or fourth channels.

9. The coupler according to claim 6 wherein said radiation is optical radiation.

10. The coupler according to claim 6 wherein said first second third and fourth channels are waveguides.

11. The coupler according to claim 6 wherein said radiation beam is optical radiation emitted by a laser and said laser is integral with said input beam splitter.

12. The coupler according to claim 6 wherein said coupler further comprises fifth and sixth substantially parallel channels extending between said first and third and said second and fourth channels respectively.

13. The coupler according to claim 12 wherein said first and second delay elements are connected to a driver in a push pull configuration.

14. A solid state energy transfer system comprising:
A. a radiation source;
B. A solid state radiation coupler comprising a radiation input end and a radiation output end, the coupler having a central axis extending along a "θ" axis of a Cartesian co-ordinate system, the coupler further comprising:
   a. an input radiation beam splitter comprising a first and a second diverging equidistant solid state radiation propagation channels extending from said coupler input, each of said channels diverging relative to said central axis;
   b. a third and a fourth also solid state equidistant converging radiation propagation channels connected to said first and second diverging channels respectively, each of said third and fourth channels converging toward said z axis at a substantially same interference angle "θ" relative to said axis,
   c. wherein radiation exiting said third and fourth channels generates an interference pattern in an interference zone, said zone extending by a distance $L_{int}/2$ on either side of a point on said z axis where a center line of a beam propagating along said third channel and a beam propagating along said fourth channel intersect and wherein said third and said fourth channels terminate prior to overlapping at or before the onset of said interference zone; and
C. a radiation receptor having an input surface located within said interference zone;
wherein said interference angle θ is calculated to create a primary constructive interference fringe providing optimal matching of said interference fringe mode to said receptor input end mode.

15. The system according to claim 14 wherein said radiation is optical radiation, said receptor is a single mode fiber having a fiber mode field and said primary constructive interference fringe provides optimal matching to said fiber mode.

16. The system according to claim 15 wherein said single mode fiber input surface is in an x-y plane of said Cartesian coordinate system at a point in said interference zone wherein said constructive interference fringe mode best matches said fiber mode.

17. The system according to claim 14 wherein said single mode fiber input surface is in an x-y plane of said Cartesian coordinate system and is placed at a distance from one of said channel ends equal to the Rayleigh distance for optical radiation exiting said end.

18. The system according to claim 14 wherein said optical radiation source is a laser and said laser is integral with said input beam splitter.

19. The system according to claim 14 wherein said radiation receptor is fixedly mounted in position within said interference zone relative to said coupler.

20. The system according to claim 14 further comprising at least one phase delay element in at least one of said first, second, third or fourth channels for introducing sufficient phase delay to radiation propagating along said channel to shift said constructive interference fringe in said interference zone laterally outside of said input surface of said radiation receptor.

21. The system according to claim 20 further comprising a controller connected to said phase delay element for controlling the degree of said phase delay introduced by said phase delay element.

22. The system according to claim 20 further comprising a plurality of substantially coplanar adjacent radiation receptor input faces within said interference zone.

23. The system according to claim 22 wherein said radiation receptor input faces are input faces of additional radiation couplers.

24. The system according to claim 22 further comprising a driver for controlling said radiation phase delay.

25. A method for coupling a radiation beam to a first receptor input, the method comprising:
   a. splitting said radiation beam into a first and a second substantially equal intensity beams propagating along first and second solid state equidistant diverging channels;
   b. directing said split diverging beams to and along a third and a fourth also solid state equidistant converging radiation propagation channels respectively, said channels converging at an angle 2θ relative to each other, wherein said third and fourth channels terminate at an end point prior to overlapping;
   c. forming an interference pattern of said converging third and fourth beams comprising at least one constructive interference fringe in an interference zone after exiting said third and fourth channels; and
   d. positioning said radiation receptor input end in said interference zone at a point where said constructive interference fringe mode matches said first receptor input.

26. The method of claim 25 further comprising applying a phase delay to at least one of said radiation beams propagating along said channels to shift said constructive interference fringe in said interference pattern laterally away from said first receptor input.

27. The method of claim 26 further comprising positioning at least one more receptor input end adjacent said first receptor input end and shifting said constructive interference fringe from said first receptor input to said at least one more receptor input.

* * * * *

UNITED STATES PATENT AND TRADEMARK OFFICE
CERTIFICATE OF CORRECTION

PATENT NO. : 7,054,511 B2  Page 1 of 1
APPLICATION NO. : 10/678368
DATED : May 30, 2006
INVENTOR(S) : Noureddine Melikechi et al.

It is certified that error appears in the above-identified patent and that said Letters Patent is hereby corrected as shown below:

At column 10, line 28 --claim 2-- should read "claim 1"

At column 10, line 31 --claim 1-- should read "claim 2"

Signed and Sealed this

Twelfth Day of September, 2006

JON W. DUDAS
*Director of the United States Patent and Trademark Office*